United States Patent
Sloane et al.

(10) Patent No.: US 11,645,384 B2
(45) Date of Patent: May 9, 2023

(54) SYSTEM FOR ELECTRONIC DATA OBFUSCATION AND PROTECTION USING INDEPENDENT DESTRUCTIBLE DATA OBJECTS

(71) Applicant: BANK OF AMERICA CORPORATION, Charlotte, NC (US)

(72) Inventors: Brandon Sloane, Indian Land, SC (US); John Howard Kling, Alexandria, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 218 days.

(21) Appl. No.: 17/190,760

(22) Filed: Mar. 3, 2021

(65) Prior Publication Data
US 2022/0284125 A1    Sep. 8, 2022

(51) Int. Cl.
*G06F 21/54* (2013.01)
*G06F 21/31* (2013.01)
*G06F 21/60* (2013.01)

(52) U.S. Cl.
CPC .............. *G06F 21/54* (2013.01); *G06F 21/31* (2013.01); *G06F 21/604* (2013.01)

(58) Field of Classification Search
CPC ......... H04L 63/0428; H04L 63/20–205; G06F 21/31; G06F 21/54; G06F 21/60; G06F 21/604; G06F 21/62–6281; G06F 21/78–805; G06F 2221/2143
See application file for complete search history.

(56) References Cited

U.S. PATENT DOCUMENTS

| | | |
|---|---|---|
| 8,082,403 B1 | 12/2011 | Allen et al. |
| 8,112,625 B2 | 2/2012 | Ginter et al. |
| 8,112,809 B2 | 2/2012 | Chou et al. |
| 8,336,109 B2 | 12/2012 | Zhang |
| 8,340,297 B2 | 12/2012 | Kim |
| 8,494,965 B2 | 7/2013 | Gordon |
| 8,584,259 B2 | 11/2013 | Le Chevalier et al. |
| 9,892,276 B2 | 2/2018 | Bell et al. |
| RE47,772 E | 12/2019 | Diamond et al. |
| 2007/0050643 A1 | 3/2007 | Negishi |
| 2007/0136204 A1 | 6/2007 | Oh et al. |
| 2007/0174429 A1* | 7/2007 | Mazzaferri ........... H04L 63/102 709/218 |
| 2007/0250911 A1 | 10/2007 | Nimon et al. |
| 2008/0127332 A1 | 5/2008 | Kawai |

(Continued)

*Primary Examiner* — Kevin Bechtel
(74) *Attorney, Agent, or Firm* — Moore & Van Allen PLLC; Seongun M. Hong

(57) ABSTRACT

A system is provided for electronic data obfuscation and protection using independent destructible data objects. The system may split a set of data into a data portion and a key portion, where the data portion may be stored in a database separately from the key portion. The data portion may further comprise a set of executable code for a time or iteration based destructible data object, where the data object may incrementally decrease a countdown value based on the passage of time and/or iterations. If the countdown value reaches a threshold value without being refreshed, the data object may automatically execute one or more processes to protect the set of data. In this way, the system provides a secure way to prevent unauthorized access to sensitive data.

20 Claims, 2 Drawing Sheets

(56) References Cited

U.S. PATENT DOCUMENTS

| | | |
|---|---|---|
| 2009/0125722 A1 | 5/2009 | Gomaa et al. |
| 2009/0199279 A1 | 8/2009 | Lange et al. |
| 2010/0011180 A1 | 1/2010 | Kashima |
| 2010/0031049 A1 | 2/2010 | Shima et al. |
| 2011/0055589 A1 | 3/2011 | Hsieh et al. |
| 2011/0185179 A1 | 7/2011 | Swaminathan et al. |
| 2011/0289594 A1 | 11/2011 | Shibata et al. |
| 2012/0272052 A1 | 10/2012 | Wichmann et al. |
| 2013/0268740 A1* | 10/2013 | Holt ................ G06F 21/00 711/163 |
| 2014/0109234 A1 | 4/2014 | Lin et al. |
| 2019/0238488 A1* | 8/2019 | Peng ................ G06Q 20/0655 |
| 2020/0334372 A1* | 10/2020 | Kim ................ H04L 63/102 |

* cited by examiner

SYSTEM FOR ELECTRONIC DATA OBFUSCATION AND PROTECTION USING INDEPENDENT DESTRUCTIBLE DATA OBJECTS

FIELD OF THE INVENTION

The present disclosure embraces a system for electronic data obfuscation and protection using independent destructible data objects.

BACKGROUND

There is a need for a way to secure and protect electronic data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for electronic data obfuscation and protection using independent destructible data objects. In particular, the system may split a set of data into a data portion and a key portion, where the data portion may be stored in a database separately from the key portion. Accordingly, the set of data may not be read until the set of data is reconstituted by combining the data portion and the key portion. The data portion may further comprise a set of executable code for a time or iteration based destructible data object, where the data object may incrementally decrease a countdown value based on the passage of time and/or iterations. If the countdown value reaches a threshold value without being refreshed, the data object may automatically execute one or more processes to protect the set of data. In this way, the system provides a secure way to prevent unauthorized access to sensitive data.

Accordingly, embodiments of the present disclosure provide a system for electronic data obfuscation and protection using independent destructible data objects. The system may comprise a memory device with computer-readable program code stored thereon; a communication device; and a processing device operatively coupled to the memory device and the communication device. The processing device may be configured to execute the computer-readable program code to receive a request to store a set of data in a database; split the set of data into a data portion and a key portion; store the data portion in a first database and the key portion in a second database; and associate a destructible data object with the data portion, wherein the destructible data object comprises executable code that, when executed, initiates a countdown process, the countdown process comprising incrementally decreasing a countdown value associated with the data portion; detecting that the countdown value has reached a defined countdown threshold; and automatically executing one or more protective actions on the data portion.

In some embodiments, the countdown process further comprises receiving an authorization input from a trusted computing system; and resetting the countdown value.

In some embodiments, the destructible data object is a data wrapper, wherein associating the destructible data object with the data portion comprises encapsulating the data portion in the destructible data object.

In some embodiments, the destructible data object is embedded within the data portion in obfuscated form, wherein the destructible data object is automatically executed when the data portion is accessed.

In some embodiments, decreasing the countdown value is a time-based process comprising detecting a passage of time based on at least one of a system clock, internet time, and a number of clock cycles; and decreasing the countdown value according to the passage of time.

In some embodiments, decreasing the countdown value is an iteration-based process comprising decreasing the countdown value each time that the data portion is accessed.

In some embodiments, the one or more protective actions comprises reversibly altering the data portion such that the set of data cannot be reconstituted by combining the data portion with the key portion; receiving an authorization input from a trusted computing system; and reversing alteration of the data portion.

In some embodiments, the one or more protective actions comprises irreversibly altering the data portion such that the set of data cannot be reconstituted by combining the data portion with the key portion.

In some embodiments, the one or more protective actions comprises wiping the data portion.

In some embodiments, the data portion is obfuscated using one or more masking algorithms, wherein the one or more protective actions comprises altering the data portion to remain in an obfuscated state.

Embodiments of the present disclosure also provide a computer program product for electronic data obfuscation and protection using independent destructible data objects, the computer program product comprising at least one non-transitory computer readable medium having computer-readable program code portions embodied therein, the computer-readable program code portions comprising executable code portions for receiving a request to store a set of data in a database; splitting the set of data into a data portion and a key portion; storing the data portion in a first database and the key portion in a second database; and associating a destructible data object with the data portion, wherein the destructible data object comprises executable code that, when executed, initiates a countdown process, the countdown process comprising incrementally decreasing a countdown value associated with the data portion; detecting that the countdown value has reached a defined countdown threshold; and automatically executing one or more protective actions on the data portion.

In some embodiments, the countdown process further comprises receiving an authorization input from a trusted computing system; and resetting the countdown value.

In some embodiments, the destructible data object is a data wrapper, wherein associating the destructible data object with the data portion comprises encapsulating the data portion in the destructible data object.

In some embodiments, the destructible data object is embedded within the data portion in obfuscated form, wherein the destructible data object is automatically executed when the data portion is accessed.

In some embodiments, decreasing the countdown value is a time-based process comprising detecting a passage of time based on at least one of a system clock, internet time, and a number of clock cycles; and decreasing the countdown value according to the passage of time.

Embodiments of the present disclosure also provide a computer-implemented method for electronic data obfuscation and protection using independent destructible data objects, wherein the computer-implemented method comprises receiving a request to store a set of data in a database; splitting the set of data into a data portion and a key portion; storing the data portion in a first database and the key portion in a second database; and associating a destructible data object with the data portion, wherein the destructible data object comprises executable code that, when executed, initiates a countdown process, the countdown process comprising incrementally decreasing a countdown value associated with the data portion; detecting that the countdown value has reached a defined countdown threshold; and automatically executing one or more protective actions on the data portion.

In some embodiments, the countdown process further comprises receiving an authorization input from a trusted computing system; and resetting the countdown value.

In some embodiments, the destructible data object is a data wrapper, wherein associating the destructible data object with the data portion comprises encapsulating the data portion in the destructible data object.

In some embodiments, the destructible data object is embedded within the data portion in obfuscated form, wherein the destructible data object is automatically executed when the data portion is accessed.

In some embodiments, decreasing the countdown value is a time-based process comprising detecting a passage of time based on at least one of a system clock, internet time, and a number of clock cycles; and decreasing the countdown value according to the passage of time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
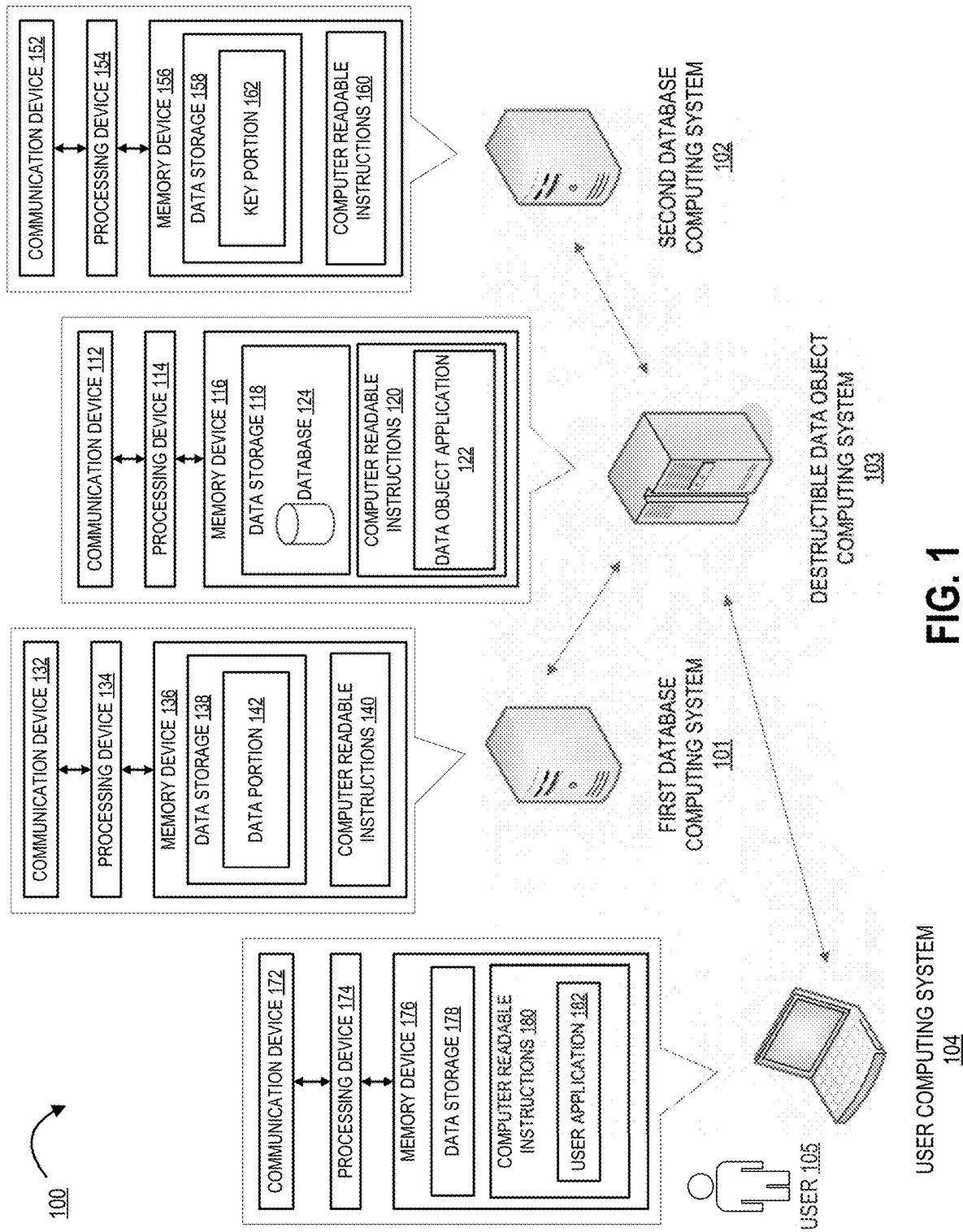
Figure 2:
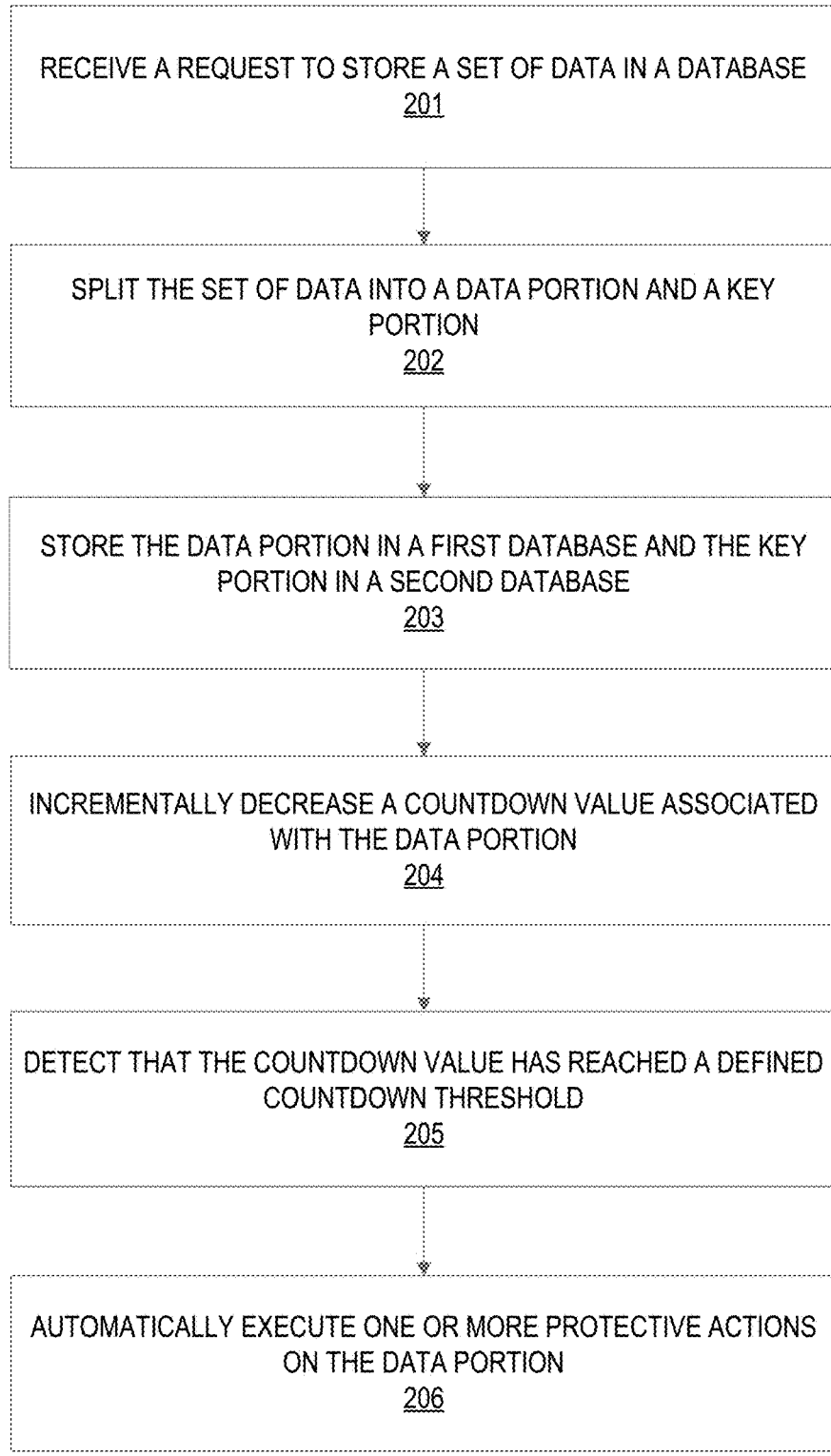

Having thus described embodiments of the invention in general terms, reference will now be made to the accompanying drawings, wherein:

FIG. 1 illustrates an operating environment for the destructible data object system, in accordance with one embodiment of the present disclosure; and FIG. 2 illustrates a process flow for securing data using a destructible data object, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Data masking" or "data obfuscation" as used herein may refer to one or more processes to obscure the original or true value of data by modifying one or more aspects of the data. For instance, data obfuscation may be applied to a particular data field by adding, replacing, and/or removing one or more of the characters within the data field.

The system as described herein provides a way to mitigate the possibility of unauthorized access to sensitive or confidential data. In this regard, the system may divide a set of data (e.g., sensitive data to be protected by the system) into a data portion and a key portion. The data portion may be stored within a separate database from that of the key portion such that no single database stores the entirety of the set of data. Accordingly, in order to restore the set of data, the set of data must be reconstituted using authorized access to the data portion and the key portion.

In some embodiments, the data portion of the set of data may comprise an executable code portion for a destructible data object, where the data object may be configured to initiate a countdown process in which the data object incrementally decreases a countdown value. In some embodiments, the countdown value may be decreased according to the passage of time (e.g., a time-based countdown). In such embodiments, the countdown value may decrease based on system clock information, internet-based time information, CPU clock cycles, or the like. In other embodiments, the countdown value may be decreased according to the number of iterations of a particular event or process (e.g., an iteration-based countdown). For example, the countdown value may be decreased each time a user or device attempts to access, move, copy, and/or modify the data portion.

The data object may further be configured to reset or refresh the countdown value based on receiving an authorization input from a trusted and/or authorized entity (e.g., a user, device, or system). For instance, the data object may be configured to transmit a communication signal to a trusted server (e.g., an authorization server) and refresh the countdown value upon receiving an input from the authorization server. In other embodiments, the countdown value automatically may be reset without a deliberate input from a trusted user, device, or system based on the existence of certain trusted conditions. For example, the data object may detect, using hardware and/or software info (e.g., a MAC address), that the set of data is stored on a trusted device. In such embodiments, the data object may freeze the countdown value without decreasing the countdown value until the trusted condition no longer exists (e.g., the set of data is copied and stored away from the trusted device).

If the countdown value reaches a defined threshold without being refreshed by a trusted entity, the data object may automatically execute one or more actions to protect the set of data. For instance, the data object may modify or alter the data portion to render the data portion incompatible with the key portion, thereby preventing the set of data from being reformed using the data portion and the key portion. In other embodiments, the data object may overwrite, delete, and/or wipe the information within the set of data. By implementing a destructible data object in this way, the system may protect data from being accessed and/or used by unauthorized entities when the data is transferred outside of the trusted environment (e.g., by unauthorized retrieval from a trusted server).

In some embodiments, the data object may be implemented as a wrapper around the set of data. In such embodiments, the data object may encapsulate the set of data and grant access to the set of data only upon receiving the key portion associated with the set of data. In other embodiments, the data object may be implemented as hidden executable code within the set of data. In such embodiments, the data object may be executed when the set of data is accessed or viewed (e.g., the data file or data entry containing the set of data is opened). The set of data and/or the data object may be obfuscated to provide the appearance of legitimate data. Upon receiving the key portion, the data object may unmask/de-obfuscate the set of data to reveal the true data. If, however, the countdown value drops below the defined threshold (e.g., if the countdown value has not been reset by a trusted entity), the data portion and/or the data object may remain in an obfuscated state even if the key portion is provided. In such a scenario, an unauthorized user may not be aware that the set of data is obfuscated or that the data object has executed its data protection processes.

An exemplary embodiment is provided below for illustrative purposes and is not intended to restrict the scope of the disclosure. In one embodiment, the system may split a set of user data (e.g., sensitive data associated with a particular user) into a data portion and a key portion, where each portion may be stored in separate databases. So long as the data portion and/or the key portion are maintained in trusted databases, the data object associated with the data portion may maintain the countdown value associated with the set of data at a fixed value. Subsequently, if the data portion and/or the key portion are transferred from the trusted databases (e.g., an unauthorized user has compromised the set of data by copying the data portion and/or the key portion from the trusted databases), the data object may detect that an authorization input has not been received from a trusted entity and initiate a countdown by incrementally decreasing a countdown value based on the passage of time. Once the countdown value reaches a threshold (e.g., a threshold amount of time has elapsed), the data object may automatically wipe the data portion when the unauthorized user attempts to open the data portion and/or reconstitute the set of data using the key portion, thereby preventing access to the set of data.

The system as described herein confers a number of technological advantages over conventional data security systems. In particular, by implementing the countdown-based destructible data objects as described herein, the system may reduce the incidence of unauthorized access to sensitive data. Furthermore, by embedding the data object into the set of data in an obfuscated manner, the system may be able to mask the data and data protection processes such that unauthorized users are unaware that such masking and/or such data protection processes have occurred.

Turning now to the figures, FIG. 1 illustrates an operating environment 100 for the destructible data object system, in accordance with one embodiment of the present disclosure. In particular, FIG. 1 illustrates a destructible data object computing system 103 that is operatively coupled, via a network, to a first database computing system 101, second database computing system 102, and/or a user computing system 104. In such a configuration, the destructible data object computing system 103 may transmit information to and/or receive information from the first database computing system 101, the second database computing system 102, and/or the user computing system 104.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a first database computing system 101 and a second database computing system 102, some embodiments may include a fewer or greater number of database computing systems which may store split parts of data. It should also be understood that one or more functions of the systems, devices, or servers as depicted in FIG. 1 may be combined into a single system, device, or server. For instance, in some embodiments, the functions of the first database computing system 101 and/or the second database computing system 102 may be performed by the destructible data object computing system 103. Furthermore, a single system, device, or server as depicted in FIG. 1 may represent multiple systems, devices, or servers. For instance, though the destructible data object computing system 103 is depicted as a single unit, the functions of the destructible data object computing system 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the destructible data object computing system 103 may be a networked server, desktop computer, laptop computer, routing device, or other type of computing system within the network environment which performs the processes for splitting a set of data into data portions and key portions and/or reconstituting the set of data, wrapping or embedding the destructible data objects into the data portions and/or key portions, and/or providing authorization inputs as described herein. Accordingly, the destructible data object computing system 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the first database computing system 101 and/or the second database computing system 102. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may be used to store information needed to perform the processes of the destructible data object computing system 103 (e.g., an index of data portions and/or key portions, trusted device pass lists, and the like). The memory device 116 may further have computer-readable instructions 120 stored thereon, where the computer-readable instructions 120 may comprise a data object application 122, which may comprise computer-executable program code which may instruct the processing device 114 to perform certain logic, data processing, and data storing functions of the application to accomplish the entity's objectives. For instance, the data object application 122 may split sets of data into data portions and/or key portions, encapsulate and/or embed destructible data objects into the data portions and/or key portions, provide authorization inputs to the destructible data objects, and the like.

As further illustrated in FIG. 1, the operating environment 100 may further comprise a first database computing system 101 in operative communication with the destructible data object computing system 103. In particular, the first database computing system 101 may be a computing system that may store one or more data parts according to the splits determined by the destructible data object computing system 103. Accordingly, the first database computing system 101 may be a computing system such as a server or networked terminal, though it is within the scope of the disclosure for the first database computing system 101 to be a device such as a desktop computer, laptop, IoT device, smartphone, tablet, single-board computer, or the like.

The first database computing system 101 may comprise a processing device 134 operatively coupled to a communication device 132 and a memory device 136 having data storage 138 and computer readable instructions 140 stored thereon. The data storage 138 may comprise a data portion 142, which may be a first portion or segment of a data set that was split by the destructible data object computing system 103. Accordingly, the data portion 142 may be retrieved by the destructible data object computing system 103 and combined with other data parts (e.g., a key portion from a different database) to form a complete copy of the original data record and/or data set.

The operating environment 100 may further comprise a second database computing system 102 comprising a processing device 154 operatively coupled to a communication device 152 and a memory device 156 comprising data storage 158 and computer readable instructions 160. The data storage 158 of the second database computing system 102, similar to that of the first database computing system 101, may comprise a key portion 162, which may be a second portion or segment of a data record or data set that was split by the destructible data object computing system 103. In this regard, the key portion 162 may be retrieved by the destructible data object computing system 103 and combined with other data parts (e.g., the data portion 142 stored on the first database computing system 101) to form a complete copy of the original data record and/or data set (e.g., in response to a query from the user computing system 104).

In some embodiments, the operating environment 100 may further comprise a user computing system 104. The user computing system 104 may be a computing system that may attempt to reconstitute the set of data from the data portion 142 and the key portion 162 and/or access the reconstituted set of data as created by the destructible data object computing system 103. In this regard, the user computing system 104 may be a computing system that is operated by a user 105, such as an administrator, agent, or employee of the entity. In other embodiments, the user 105 may be an unauthorized user who is attempting to gain access to the set of data using the data portion 142 and/or the key portion 162. Accordingly, the user computing system 104 may be a computing system such as a desktop computer, laptop computer, smartphone or smart device, tablet, single board computer, or the like, though it is within the scope of the disclosure for the user computing system 104 to be any other kind of computing system as described herein (e.g., a "headless" computing system such as a server). The user computing system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 105.

The user computing system 104 may comprise a processing device 174 operatively coupled to a communication device 172 and a memory device 176, the memory device 176 comprising data storage 178 and computer readable instructions 180. The computer readable instructions 180 may comprise a user application 182, which in some embodiments may be an application with a graphical interface that may allow the user 105 to attempt to access the data portion 142 and/or the key portion 162 and/or the complete set of data by combining the data portion 142 with the key portion 162. Accordingly, the executable code within the data object associated with the data portion 142 and/or the key portion 162 may be automatically executed whenever the user computing system 104 attempts to access the data portion 142, key portion 162, and/or the set of data.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for securing data using a destructible data object, in accordance with some embodiments of the present disclosure. The process begins at block 201, where the system receives a request to store a set of data in a database. The set of data may be, for instance, data that an entity is seeking to protect from unauthorized access, viewing, copying, and/or the like. Accordingly, in an exemplary embodiment, the set of data may include sensitive data such as personal information associated with a particular user (e.g., a client of the entity). Accordingly, the set of data may be encrypted using one or more cryptographic algorithms and/or obfuscated using one or more masking algorithms.

The process continues to block 202, where the system splits the set of data into a data portion and a key portion. The splits performed by the system may be stored in a data split index, where the data split index may be a table indicating which data portions are associated with which key portions. Once the set of data is split into the data portion and the key portion, the set of data may be reconstituted by combining the data portion with the key portion. In some embodiments, combining the data portion with the key portion may further cause the set of data to be decrypted and/or de-obfuscated, thereby allowing the set of data to be opened and/or viewed.

The process continues to block 203, where the system stores the data portion in a first database and the key portion in a second database. The first database may be logically and/or physically separated from the second database such that no single database contains the entire set of data. By arranging the set of data in this way, the system may help prevent unauthorized access to the full set of data in the event that a particular database (e.g., the first database) is compromised. In some embodiments, the information about the storage locations (e.g., server name, IP and/or MAC address, system information, logical storage paths, storage devices, and the like) of the data portions and/or the key portions may be stored within the data split index, which in some embodiments may be stored within a separate database and/or computing system from that of the first database and/or the second database.

In some embodiments, the system may associate a destructible data object with the data portion and/or the key portion. In one embodiment, the destructible data object may comprise executable code that may encapsulate the data portion in a wrapper form. In such embodiments, the executable code may need to be executed in order to access the data portion. Accordingly, the executable code may restrict access to the data portion until the key portion is provided. In other embodiments, the destructible data object, along with the executable code, may be embedded (and hidden) within the data portion in an obfuscated form such that the executable code is loaded into memory and executed whenever the data portion is accessed. In such embodiments, the user and/or user computing system may be unaware that the executable code is being executed. The data object may comprise a countdown function that may execute one or more processes depending on the existence of certain conditions, as will be described in further detail below.

The process continues to block 204, where the system incrementally decreases a countdown value associated with the data portion. In some embodiments, the data object may begin decreasing the countdown value based on detecting that the data portion is being accessed from a non-trusted computing system. In this regard, the system may maintain a pass list of trusted computing systems, which may contain information on trusted systems (e.g., certificates, secure tokens, and the like). If an unauthorized user attempts to copy and access the data portion from a computing system that does not appear on the pass list, the data object may begin the countdown and begin decreasing the countdown value. In other embodiments, the data object may be configured to periodically receive authorization inputs from a trusted computing system. If an authorization input is received from a trusted computing system (e.g., an authorization server), the countdown value may be reset. In such embodiments, the countdown value may be maintained above a threshold even if the data portion is stored on a computing system that is not registered within the pass list.

In some embodiments, the countdown value may be decreased according to time-based countdown. In such embodiments, the data object may detect the passage of time according to system clock information, internet time information, number of clock cycles, or the like, and decrease the countdown value according to the passage of time (e.g., decrease countdown value by 1 for each second of passed time). In other embodiments, the countdown value may be decreased according to an iterative process. In such embodiments, the countdown value may be decreased each time a computing system attempts to access the data portion (e.g., decrease countdown value by 1 each time the data portion is opened or viewed).

The process continues to block 205, where the system detects that the countdown value has reached a defined countdown threshold. The countdown threshold may be set according to the sensitivity of the data to be protected. For instance, if the set of data is of relatively higher sensitivity, the countdown threshold may be a relatively higher value, thereby causing the countdown to be shorter. Conversely, if the set of data is of relatively lower sensitivity, the countdown threshold may be set to a relatively lower value, thereby causing the countdown to be longer. Alternatively, in some embodiments, the sensitivity of the data may cause an increase or decrease in the rate at which the countdown value is incrementally decreased. For example, more sensitive data may cause the countdown value to be decreased in larger intervals, whereas less sensitive data may cause the countdown value to be decreased in smaller intervals.

The process continues to block 206, where the system automatically executes one or more protective actions on the data portion. The one or more protective actions may include, for instance, altering the data portion such that the set of data may not be reconstituted using the key portion. In some embodiments, the alteration may be reversible such that the data portion may be returned to its original state upon receiving an authorization input from a trusted computing system. In other embodiments, the alteration may be irreversible such that the data portion may be irretrievably altered, depending on the sensitivity of the set of data. In other embodiments, the one or more protective actions may include wiping or deleting at least a portion of the data portion. In yet other embodiments, such as embodiments in which the data object is implemented as an embedded and obfuscated manner, the one or more protective actions may include altering the data portion such that the data portion remains in a permanently obfuscated state. In such scenarios, unauthorized users may be unaware that the data portion is obfuscated and/or that such alteration of the data portion has occurred. By using destructible data objects in this manner, the system may limit the unauthorized access to data when the data is accessed from unauthorized computing systems and/or is removed from its trusted environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for electronic data obfuscation and protection using independent destructible data objects, wherein the computer-implemented method comprises:
    receiving a request to store a set of data in a database;
    splitting the set of data into a data portion and a key portion;
    storing the data portion in a first database and the key portion in a second database; and
    associating a destructible data object with the data portion, wherein the destructible data object comprises executable code that, when executed, initiates a countdown process, the countdown process comprising:
        detecting, based on hardware and software information, that the data portion is stored on a trusted computing system;
        freezing a countdown value associated with the data portion, wherein freezing the countdown value prevents the countdown value from decreasing;
        detecting that the data portion is no longer stored on the trusted computing system;
        based on detecting that the data portion is no longer stored on the trusted computing system, incrementally decreasing the countdown value associated with the data portion;
        detecting that the countdown value has reached a defined countdown threshold; and
        automatically executing one or more protective actions on the data portion.

2. The computer-implemented method according to claim 1, wherein the countdown process further comprises:
    receiving an authorization input from the trusted computing system; and
    resetting the countdown value.

3. The computer-implemented method according to claim 1, wherein the destructible data object is a data wrapper, wherein associating the destructible data object with the data portion comprises encapsulating the data portion in the destructible data object.

4. The computer-implemented method according to claim 1, wherein the destructible data object is embedded within the data portion, the data portion being in obfuscated form, wherein the destructible data object is automatically executed when the data portion is accessed.

5. The computer-implemented method according to claim 1, wherein decreasing the countdown value is a time-based process comprising:
    detecting a passage of time based on at least one of a system clock, internet time, and a number of clock cycles; and
    decreasing the countdown value according to the passage of time.

6. A computer program product for electronic data obfuscation and protection using independent destructible data objects, the computer program product comprising at least one non-transitory computer readable medium having computer-readable program code portions embodied therein, the computer-readable program code portions comprising executable code portions for:
    receiving a request to store a set of data in a database;
    splitting the set of data into a data portion and a key portion;
    storing the data portion in a first database and the key portion in a second database; and
    associating a destructible data object with the data portion, wherein the destructible data object comprises executable code that, when executed, initiates a countdown process, the countdown process comprising:
        detecting, based on hardware and software information, that the data portion is stored on a trusted computing system;
        freezing a countdown value associated with the data portion, wherein freezing the countdown value prevents the countdown value from decreasing;
        detecting that the data portion is no longer stored on the trusted computing system;
        based on detecting that the data portion is no longer stored on the trusted computing system, incrementally decreasing the countdown value associated with the data portion;
        detecting that the countdown value has reached a defined countdown threshold; and
        automatically executing one or more protective actions on the data portion.

7. The computer program product according to claim 6, wherein the countdown process further comprises:
    receiving an authorization input from the trusted computing system; and
    resetting the countdown value.

8. The computer program product according to claim 6, wherein the destructible data object is a data wrapper, wherein associating the destructible data object with the data portion comprises encapsulating the data portion in the destructible data object.

9. The computer program product according to claim 6, wherein the destructible data object is embedded within the data portion, the data portion being in obfuscated form, wherein the destructible data object is automatically executed when the data portion is accessed.

10. The computer program product according to claim 6, wherein decreasing the countdown value is a time-based process comprising:
detecting a passage of time based on at least one of a system clock, internet time, and a number of clock cycles; and
decreasing the countdown value according to the passage of time.

11. A system for electronic data obfuscation and protection using independent destructible data objects, the system comprising:
a memory device with computer-readable program code stored thereon;
a communication device; and
a processing device operatively coupled to the memory device and the communication device, wherein the processing device is configured to execute the computer-readable program code to:
receive a request to store a set of data in a database;
split the set of data into a data portion and a key portion;
store the data portion in a first database and the key portion in a second database; and
associate a destructible data object with the data portion, wherein the destructible data object comprises executable code that, when executed, initiates a countdown process, the countdown process comprising:
detecting, based on hardware and software information, that the data portion is stored on a trusted computing system;
freezing a countdown value associated with the data portion, wherein freezing the countdown value prevents the countdown value from decreasing;
detecting that the data portion is no longer stored on the trusted computing system;
based on detecting that the data portion is no longer stored on the trusted computing system, incrementally decreasing the countdown value associated with the data portion;
detecting that the countdown value has reached a defined countdown threshold; and
automatically executing one or more protective actions on the data portion.

12. The system according to claim 11, wherein the countdown process further comprises:
receiving an authorization input from the trusted computing system; and
resetting the countdown value.

13. The system according to claim 11, wherein the destructible data object is a data wrapper, wherein associating the destructible data object with the data portion comprises encapsulating the data portion in the destructible data object.

14. The system according to claim 11, wherein the destructible data object is embedded within the data portion, the data portion being in obfuscated form, wherein the destructible data object is automatically executed when the data portion is accessed.

15. The system according to claim 11, wherein decreasing the countdown value is a time-based process comprising:
detecting a passage of time based on at least one of a system clock, internet time, and a number of clock cycles; and
decreasing the countdown value according to the passage of time.

16. The system according to claim 11, wherein decreasing the countdown value is an iteration-based process comprising decreasing the countdown value each time that the data portion is accessed.

17. The system according to claim 11, wherein the one or more protective actions comprises:
reversibly altering the data portion such that the set of data cannot be reconstituted by combining the data portion with the key portion;
receiving an authorization input from a trusted computing system; and
reversing alteration of the data portion.

18. The system according to claim 11, wherein the one or more protective actions comprises irreversibly altering the data portion such that the set of data cannot be reconstituted by combining the data portion with the key portion.

19. The system according to claim 11, wherein the one or more protective actions comprises wiping the data portion.

20. The system according to claim 11, wherein the data portion is obfuscated using one or more masking algorithms, wherein the one or more protective actions comprises altering the data portion to remain in an obfuscated state.

* * * * *